(12) United States Patent
Mukaigawa et al.

(10) Patent No.: US 11,702,142 B2
(45) Date of Patent: Jul. 18, 2023

(54) FRONT VEHICLE-BODY STRUCTURE OF VEHICLE

(71) Applicant: Mazda Motor Corporation, Hiroshima (JP)

(72) Inventors: Kosuke Mukaigawa, Hiroshima (JP); Hiroto Kido, Hiroshima (JP); Satoshi Nakamura, Hiroshima (JP); Fumihiro Kurohara, Hiroshima (JP); Satoshi Okano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 58 days.

(21) Appl. No.: 17/521,878

(22) Filed: Nov. 9, 2021

(65) Prior Publication Data

US 2022/0153352 A1     May 19, 2022

(30) Foreign Application Priority Data

Nov. 17, 2020   (JP) ................................. 2020-191012

(51) Int. Cl.
*B62D 21/15*    (2006.01)
*B62D 25/08*    (2006.01)
(Continued)

(52) U.S. Cl.
CPC ......... *B62D 21/152* (2013.01); *B62D 25/085* (2013.01); *B60R 19/18* (2013.01);
(Continued)

(58) Field of Classification Search
CPC .. B62D 21/152; B62D 25/085; B62D 21/155; B62D 21/11; B60R 2019/186; B60R 19/18; B60R 19/24
(Continued)

(56) References Cited

U.S. PATENT DOCUMENTS

| 6,494,472 B2 * | 12/2002 | Suzuki | B62D 21/11 |
| | | | 280/124.109 |
| 9,969,432 B2 * | 5/2018 | Matsushima | B62D 25/082 |

(Continued)

FOREIGN PATENT DOCUMENTS

| JP | 2014-113893 A | 6/2014 |
| JP | 2019-93942 A | 6/2019 |

*Primary Examiner* — Joseph D. Pape
*Assistant Examiner* — Dana D Ivey
(74) *Attorney, Agent, or Firm* — Xsensus LLP (57) ABSTRACT

A front vehicle-body structure of a vehicle includes: side frames of a suspension subframe; a cross member connecting front-end portions of the side frames in the vehicle width direction; a front beam member; and a connecting member connecting a front-end portion of each side frame to the front beam member. A high-rigidity portion having a higher rigidity than other portions of the side frame is at a connecting portion between the front-end portion of the side frame and the cross member. The front beam member has a side end portion extending on a vehicle-width-direction outer side relative to a connecting position with the connecting member. A protrusion portion protruding from the side end portion toward a vehicle rear side is to come into contact with the high-rigidity portion from the vehicle-width-direction outer side when a collision load from a vehicle front side is input to the side end portion.

12 Claims, 5 Drawing Sheets

(51) Int. Cl.
  *B60R 19/18* (2006.01)
  *B62D 21/11* (2006.01)
  *B60R 19/24* (2006.01)

(52) U.S. Cl.
  CPC ......... *B60R 19/24* (2013.01); *B60R 2019/186* (2013.01); *B62D 21/11* (2013.01); *B62D 21/155* (2013.01)

(58) Field of Classification Search
  USPC .................................................. 296/187.09
  See application file for complete search history.

(56) References Cited

U.S. PATENT DOCUMENTS

2015/0314742 A1    11/2015  Kato et al.
2018/0273098 A1*   9/2018   Komiya ............... B62D 21/155

\* cited by examiner

FRONT VEHICLE-BODY STRUCTURE OF VEHICLE

CROSS REFERENCE TO RELATED APPLICATION

The present application claims priority to Japanese application number 2020-191012 filed in the Japanese Patent Office on Nov. 17, 2020, the entire contents of both of which being incorporated herein by reference.

TECHNICAL FIELD

Embodiments relate to a front vehicle-body structure of a vehicle, and particularly relates to a front vehicle-body structure of a vehicle including: a pair of left and right-side frames of a suspension subframe; a cross member connecting these side frames in a vehicle width direction; and a front beam member extending in the vehicle width direction and connected to a front-end portion of each of the side frames via a connecting member.

BACKGROUND

Conventionally, there has been proposed a front vehicle-body structure that, in a so-called small overlap collision (in a collision when, for example, a range of 30%, in the vehicle width direction, of the front face of a vehicle overlap-collides with an obstacle or a barrier (in a collision test)), partly transmits a load input to a vehicle-width-direction end side of a front bumper reinforcement to a power unit through a front side frame, and thereby generates a lateral force on the vehicle to reduce deformation of the vehicle (for example, Patent Literature 1).

There has also been proposed a front vehicle-body structure that includes a load transmission member extending toward a vehicle rear side at a side extending portion of a front bumper reinforcement, and that, in a small overlap collision, causes the load transmission member to come into contact with a front side frame and deform the front side frame, and thereby absorbs collision energy (for example, Patent Literature 2).

CITATION LIST

Patent Literatures

[Patent Literature 1] Japanese Unexamined Patent Publication No. 2014-113893
[Patent Literature 2] Japanese Unexamined Patent Publication No. 2019-093942

SUMMARY

Problems to be Solved

Here, in a small overlap collision, means for reducing collision energy by generating a lateral force on the vehicle while reducing deformation of the vehicle as in Patent Literature 1 is more effective.

However, according to the structure of Patent Literature 1, although the collision energy is reduced by generating the lateral force on the vehicle in a small overlap collision, the load cannot be effectively transmitted in vehicles that have a relatively large distance between the front side frame and the power unit (engine unit) for effectively transmitting the load (such as, for example, a vehicle with a longitudinal engine, a vehicle without an engine like an electric automobile, and a vehicle with a relatively large distance between the front side frame and the power unit due to a wide tread), and hence there is a problem in effectively generating a lateral force.

Therefore, one or more embodiments has been made to solve the above problem and other problem. One or more embodiments provide a front vehicle-body structure of a vehicle capable of effectively generating a lateral force in the vehicle width direction on the vehicle in a so-called small overlap collision.

Means for Solving the Problems

In order to solve the above problem and other problems, one or more embodiments are directed to a front vehicle-body structure of a vehicle, including: a suspension subframe including a pair of left and right-side frames extending in a vehicle front-rear direction, and a cross member connecting front-end portions of the side frames in a vehicle width direction; a front beam member extending in the vehicle width direction on a vehicle front side relative to the suspension subframe; and a pair of left and right connecting members connecting the front-end portions of the pair of left and right-side frames to the front beam member in the vehicle front-rear direction. At a connecting portion between the front-end portion of each of the side frames and the cross member, a high-rigidity portion having a higher rigidity than other portions of the side frame may be provided. The front beam member may have a side end portion extending on a vehicle-width-direction outer side relative to a connecting position with each of the connecting members, and a protrusion portion protruding from the side end portion toward a vehicle rear side. The protrusion portion may be configured to come into contact with the high-rigidity portion from the vehicle-width-direction outer side when a collision load from the vehicle front side is input to the side end portion.

Accordingly, at the connecting portion between the front-end portion of the side frame and the cross member, the high-rigidity portion having a higher rigidity than other portions of the side frame is formed, and the protrusion portion of the front beam member is configured to come into contact with the high-rigidity portion from the vehicle-width-direction outer side when a collision load from the vehicle front side is input to the side end portion of the front beam member. Therefore, in a so-called small overlap collision, a collision load directed toward the vehicle rear side that is received by the side end portion is transmitted to the cross member through the high-rigidity portion as a load directed toward the vehicle width direction, thereby effectively generating a lateral force in the vehicle width on the vehicle. Such generation of a lateral force causes lateral movement of the vehicle in the small overlap collision, thereby reducing impact.

The connecting member between the front-end portion of the side frame and the front beam member may have a predetermined length in the vehicle front-rear direction, and, at the side end portion, the protrusion portion of the front beam member may be provided in a range from a position at a distance corresponding to a half of the predetermined length of the connecting member to a position at a distance corresponding to the predetermined length of the connecting member with reference to the connecting position between the front beam member and the connecting member.

The protrusion portion of the front beam member at the side end portion may be mounted in the range from a position at a distance corresponding to a half of the predetermined length of the connecting member to a position at a distance corresponding to the predetermined length of the connecting member, the distances being measured from the connecting position between the front beam member and the connecting member. Here, it is assumed that, in a so-called small overlap collision, a main load input position to the side end portion (the load input position in the vehicle width direction of the side end portion) varies, and consequently a deformed state of the side end portion of the front beam member varies. Even in such a case, according to one or more embodiments, since the protrusion member is mounted in the predetermined distance range at the side end portion, the protrusion portion may come into contact with the high-rigidity portion and generate a lateral force directed toward the vehicle width direction on the vehicle.

The protrusion portion of the front beam member at the side end portion may be provided continuously over the entire range from the position at the distance corresponding to a half of the predetermined length of the connecting member to the position at the distance corresponding to the predetermined length of the connecting member.

According to one or more embodiments thus configured, the protrusion portion may more effectively come into contact with the high-rigidity portion.

The suspension subframe may further include a center cross member extending in the vehicle width direction on the vehicle rear side relative to the cross member and connecting the side frames in the vehicle width direction. The high-rigidity portion may extend from the connecting portion between the front-end portion of each of the side frames and the cross member to a connecting portion between the side frame and the center cross member.

According to one or more embodiments thus configured, since the high-rigidity portion extends from the connecting portion between the front-end portion of the side frame and the cross member to the connecting portion between the side frame and the center cross member, a load input to the high-rigidity portion from the vehicle-width-direction outer side may be transmitted to the center cross member to more effectively generate a lateral force directed toward the vehicle width direction on the vehicle.

The vehicle may further include a stabilizer mounted adjacent to the cross member, and a support bracket for supporting the stabilizer. The support bracket may be at least partly secured to the cross member.

According to one or more embodiments thus configured, since the support bracket of the stabilizer is at least partly secured to the cross member, a load input from the vehicle-width-direction outer side may be transmitted to the stabilizer to more effectively generate a lateral force directed toward the vehicle width direction on the vehicle.

Advantageous Effects

According to the front vehicle-body structure of the vehicle according to one or more embodiments, in a so-called small overlap collision, a lateral force in the vehicle width direction on the vehicle may be effectively generated.

DETAILED DESCRIPTION

Hereinafter, a front vehicle-body structure of a vehicle according to an embodiment will be described with reference to the attached drawings.

Figure 1:
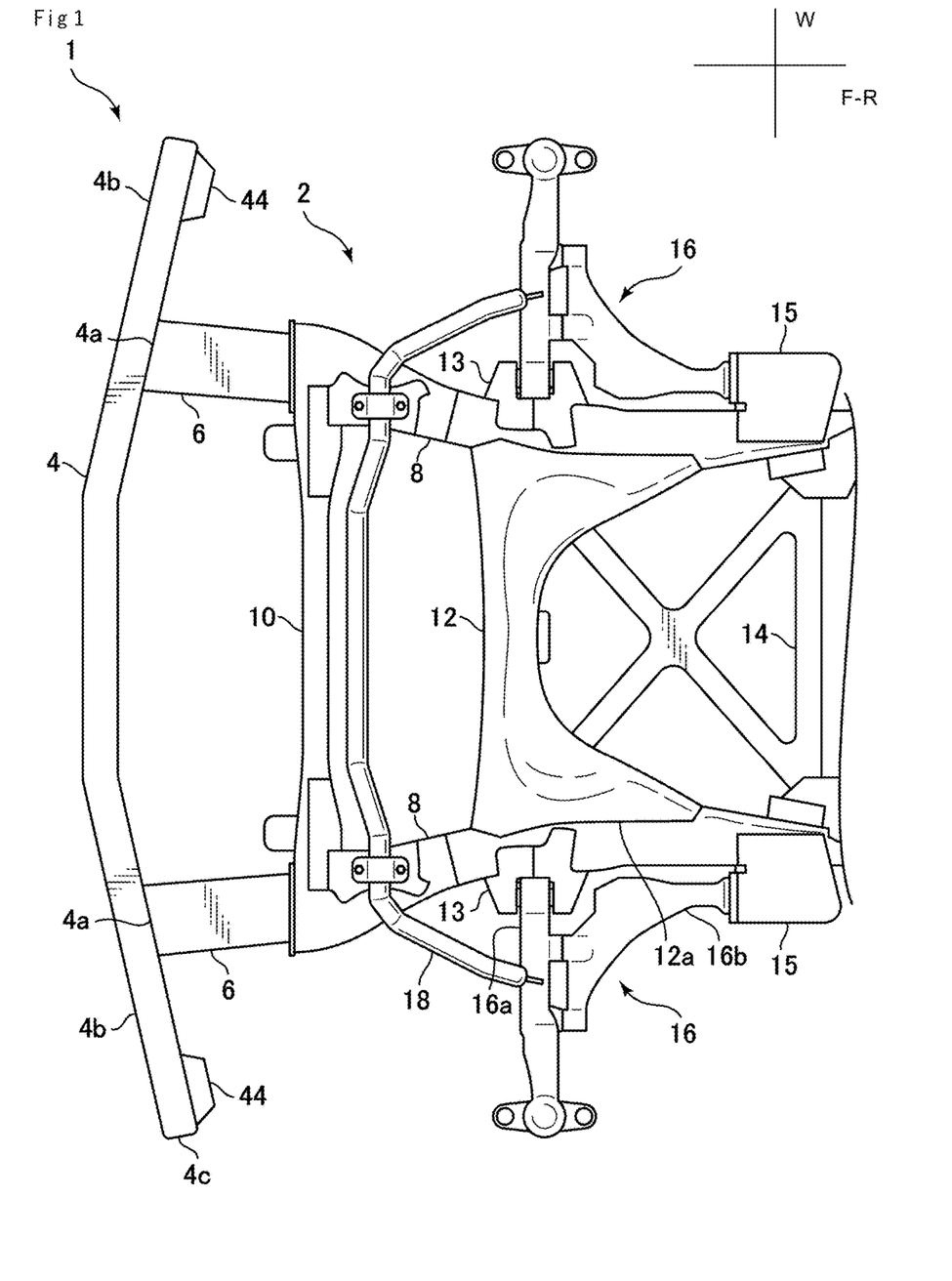
FIG. 1 is a plan view showing mainly a suspension subframe of a vehicle front portion to which a front vehicle-body structure of a vehicle according to an embodiment, and a load receiving member in front of the suspension subframe as viewed from the vehicle upper side.
Figure 2:
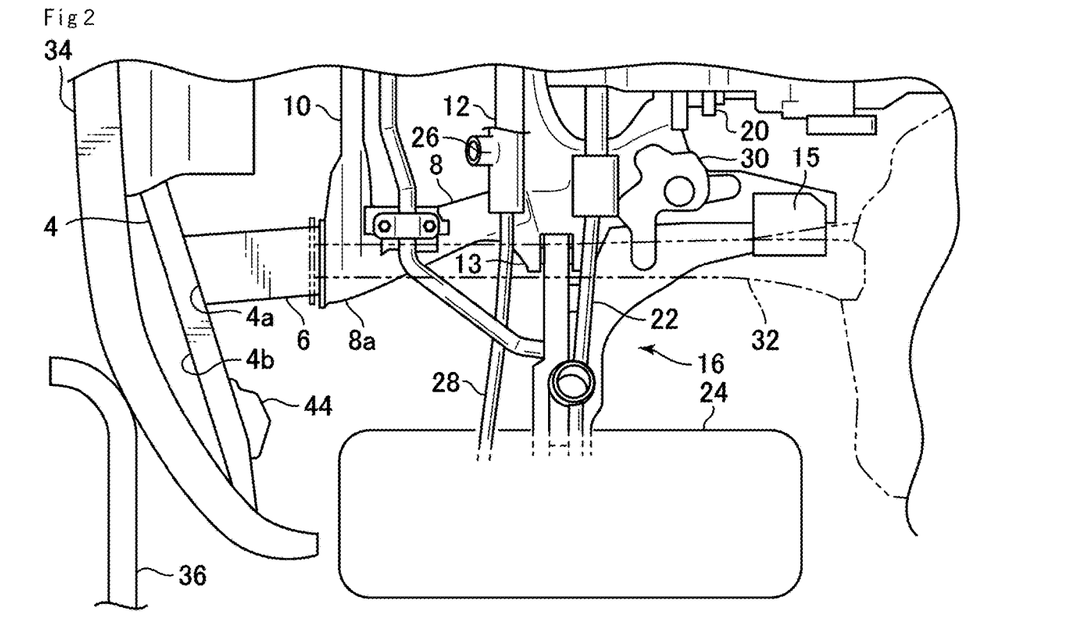
FIG. 2 is a plan view showing the structure of the left side of the vehicle front portion shown in FIG. 1, a bumper and so on as viewed from the vehicle upper side.

First, a schematic configuration of the front vehicle-body structure of the vehicle according to the embodiment will be described using FIG. 1 and FIG. 2. FIG. 1 is a plan view showing mainly a suspension subframe of a vehicle front portion to which the front vehicle-body structure of the vehicle according to the embodiment is applied, and a load receiving member in front of the suspension subframe as viewed from the vehicle upper side. FIG. 2 is a plan view showing the structure of the left side of the vehicle front portion shown in FIG. 1, a bumper and so on as viewed from the vehicle upper side. In FIG. 1, illustrations of a front side frame, a crush can, a bumper reinforcement, an engine unit, etc. mounted at the vehicle front portion are omitted.

First, as shown in FIG. 1, at a front portion of a vehicle 1 to which the front vehicle-body structure of a vehicle according to the embodiment is applied, a suspension subframe 2, a front beam member 4 extending in a vehicle width direction W in front of the suspension subframe 2, and a pair of left and right connecting members 6 connecting a front portion of the suspension subframe 2 to the front beam member 4 are mounted.

The suspension subframe 2 mainly includes a pair of left and right-side frames (suspension side frames) 8 spaced apart along the vehicle width direction W, a front cross member (front suspension cross member) 10 extending in the vehicle width direction W to connect front-end portions 8a of these side frames 8, a center cross member (center suspension cross member) 12 extending in the vehicle width direction W to connect the side frames 8 on the vehicle rear side relative to the center cross member 12, and a reinforcement member 14.

The center cross member 12 functions as the suspension cross member 12 supporting a suspension 16. An upper suspension arm 16a is swingably supported by a suspension support member 13 mounted to the side frame 8, and a lower suspension arm 16b is swingably supported by a suspension support member 15 mounted to the side frame 8. In the suspension cross member 12, as shown in FIG. 1, both edge portions 12a secured to the side frames 8 extend for a predetermined length in a vehicle front-rear direction F-R to effectively receive a load from the suspensions 16 input to the suspension support members 13, 15. The load from the suspensions 16 input to each of the suspension support members 13, 15 is also received by the front cross member 10.

A stabilizer bar (stabilizer) 18 for connecting the left and right suspensions 16 to each other is attached to the suspensions 16. The stabilizer bar 18 is supported swingably on the side frames 8 by later-described support brackets 40, 42.

In the embodiment, the front vehicle-body structure in the length direction L of the vehicle is basically formed to be left-right symmetrical in the vehicle width direction W of the vehicle, and hereinafter, the left-side portion of the vehicle in the vehicle width direction W will be mainly described.

Here, reference sign 20 shown in FIG. 2 represents a front differential gear of an engine unit, reference sign 22 represents a front axle, reference sign 24 represents a front wheel, reference signs 26, 28 represent a steering mechanism and a tie rod, respectively, and reference sign 30 represent a suspension tower.

Moreover, as shown by a virtual line in FIG. 2, reference sign 32 represents a pair of left and right front side frames extending in the vehicle front-rear direction F-R from a bulk head toward the vehicle front side, and the crush cans are connected to the front-ends of these front side frames 32, respectively, and a bumper reinforcement extending in the vehicle width direction W is connected to these crush cans.

The suspension subframe 2, the connecting members 6, the front beam member 4, and so on of the front vehicle-body structure of the vehicle 1 of the present embodiment are mounted on the vehicle lower side of the front side frames 32, etc.

In a frontal collision with an obstacle, particularly, for example, in a frontal collision with a smaller vehicle or an obstacle having a lower height relative to the vehicle 1, the vehicle 1 according to the present embodiment receives a collision load transmitted from a front bumper 34 (see FIG. 2) by the bumper reinforcement and the crush cans on the vehicle upper side, and also by the front beam member 4 on the vehicle lower side.

Reference sign 36 shown in FIG. 2 is the obstacle, and indicates a barrier used in collision tests.

Figure 3:
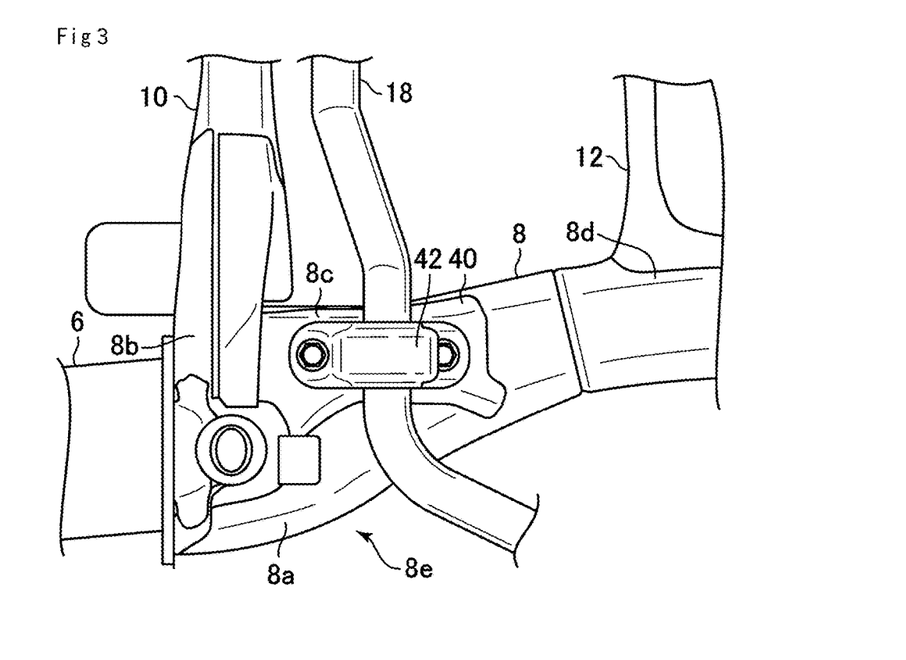
FIG. 3 is a plan view showing a cross member securing structure and a torsion bar mounting structure at a front-end portion of the suspension subframe according to the present embodiment as viewed from the vehicle upper side.

Next, a high-rigidity portion formed at the side frame in the front vehicle-body structure of the vehicle of the present embodiment will be described using FIG. 3. FIG. 3 is a plan view showing a cross member securing structure and a torsion bar mounting structure at the front-end portion of the suspension subframe of the present embodiment as viewed from the vehicle upper side.

As shown in FIG. 3, the connecting members 6 are mounted, and both end portions of the front cross member 10 are secured at the front-end portions 8a of the side frames 8. Both end portions of the front cross member 10 are formed with an angular U-shaped cross-section and a mounting portion 8b with a closed cross-section is formed by this angular U-shaped cross-section and the side frame 8. At this mounting portion 8b, the front cross member 10 is mounted to the side frame 8 by spot welding, bolt fastening, or the like.

Further, as shown in FIG. 3, the support bracket 40 for supporting the stabilizer bar 18 is partly secured to the mounting portion 8b of the front cross member 10. A support member 42 that supports the stabilizer bar 18 swingably is secured to the support bracket 40 by bolt fastening.

The support bracket 40 is a member with an angular U-shaped cross-section, and is mounted to the front side frame 10 (the mounting portion 8b) and the side frame 8 by spot welding or the like to form a mounting portion 8c having a closed cross-section.

On the vehicle rear side of the mounting portion 8c, the center cross member 12 is mounted via the mounting portion 8d to the side frame 8 by spot welding, bolt fastening or the like.

In the present embodiment, first, by mounting the stabilizer support bracket 40 to the side frame 8 at the mounting portion 8c, the high-rigidity portion is formed on the side frame 8. In particular, since the mounting portion 8c has the closed cross-section, rigidity is enhanced.

Moreover, by mounting the front cross member 10 to the side frame 8 at the mounting portion 8b, the high-rigidity portion is formed on the side frame 8. In particular, since the mounting portion 8b has the closed cross-section, rigidity is enhanced.

Further, the side frame 8 itself has a closed cross-section, and rigidity is enhanced by a reinforcement member and the like inside the closed cross-section. Additionally, the side frame 8 has an enhanced rigidity in the vehicle width direction by forming a wider cross-section having a vehicle-width-direction dimension greater than a dimension in the vehicle up-down direction, between the front-end portion 8a of the side frame 8 and the mounting portion 8d of the center cross member 12.

Furthermore, by mounting the center cross member 12 to the side frame 8 at the mounting portion 8d, a high-rigidity portion is formed on the side frame 8.

In the present embodiment, a high-rigidity portion 8e extending from the front-end portion 8a of the side frame 8 to the mounting portion 8d of the center cross member 12 is formed by the mounting portions 8b, 8c, 8d and the own rigidity of the side frame. More specifically, on the side frame 8, the high-rigidity portion 8e is formed from the mounting portion 8b of the front cross member 10 to the mounting portion 8d of the center cross member 12. In the present embodiment, particularly, rigidity of the high-rigidity portion 8e is secured by the stabilizer support bracket 40 (mounting portion 8c).

Figure 4:
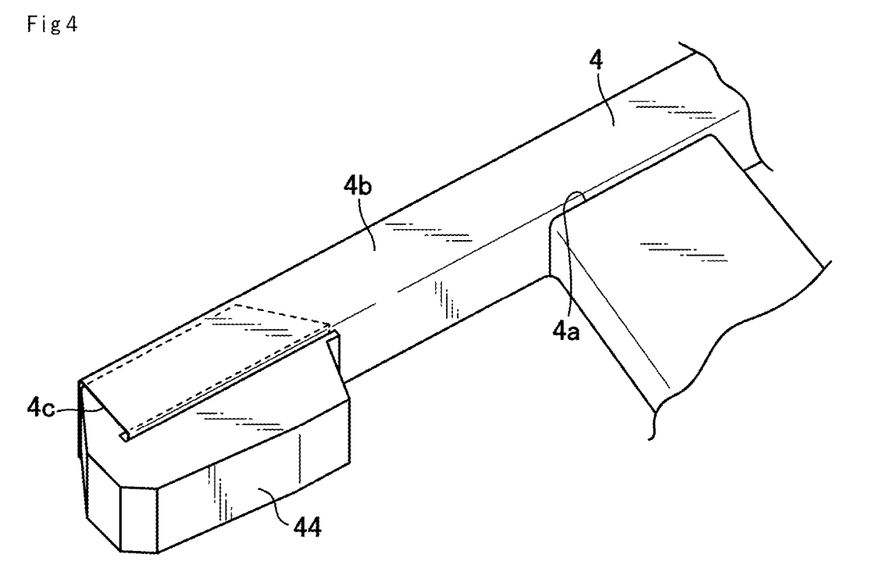
FIG. 4 is an enlarged perspective view showing a side end portion of a front beam member according to the present embodiment.

Next, the configuration of the front beam member of the front vehicle-body structure of the vehicle according to the present embodiment will be described using FIG. 1 and FIG. 4. FIG. 4 is an enlarged perspective view showing a side end portion of the front beam member according to the present embodiment.

As shown in FIG. 4, the front beam member 4 has a connecting portion 4a with the connecting member 6. The front beam member 4 has a side end portion/extending portion 4b extending from this connecting portion 4a toward a vehicle-width-direction outer side, and a protrusion member 44 is mounted to this side end portion 4b to protrude from the side end portion 4b toward the vehicle rear side. In the present embodiment, the protrusion member 44 may be made of an aluminum alloy with enhanced rigidity, and may have a hollow portion formed for weight reduction while maintaining the rigidity. In the embodiment shown in FIG. 4, the protrusion member 44 is inserted into an opening of an end portion 4c of the side end portion 4b.

Figure 5:
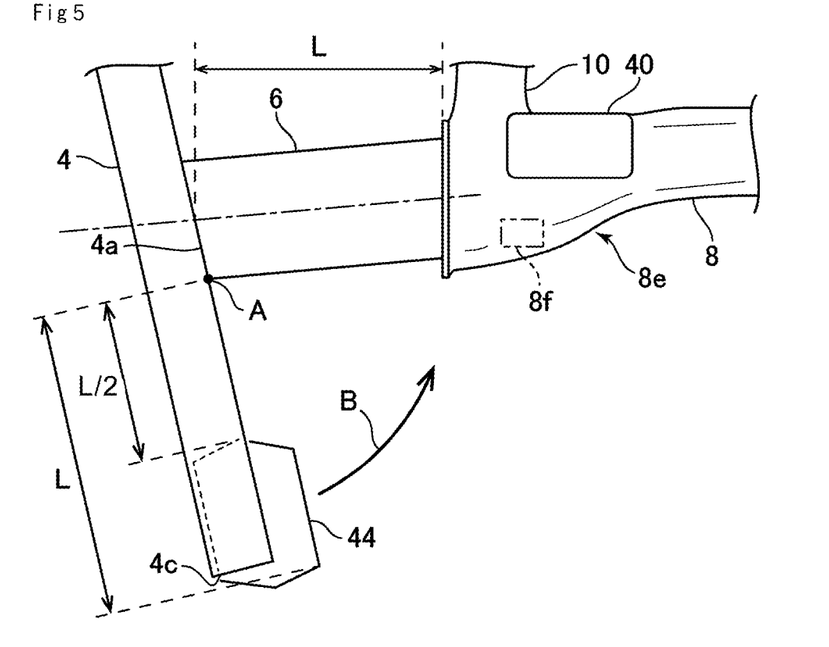
FIG. 5 is a plan view for explaining the positional relationship among a side frame, a connecting member, and a protrusion mounted to the side end portion of the front beam member at a left front portion of the vehicle of the present embodiment.

Next, the positional relationship among the side frame 8, the connecting member 6, and the protrusion member 44 formed at the side end portion of the front beam member 4 of the front vehicle-body structure of the vehicle of the present embodiment will be described using FIG. 5. FIG. 5 is a plan view for explaining the positional relationship among the side frame 8, the connecting member 6, and the protrusion member 44 formed at the side end portion of the front beam member 4 at the left front portion of the vehicle of the present embodiment.

As shown in FIG. 5, the connecting member 6 has a length L in the vehicle front-end direction and the side end portion 4b of the front beam member 4 extends in the vehicle width direction to have at least the length L of the connecting member 6. The extension of the side end portion 4b needs to be longer than or equal to the length L, and the side end portion 4b extends by the same length L as the connecting member 6 in the example shown in FIG. 5, and longer than the length L in FIG. 8 described later.

As shown in FIG. 5, at the side end portion 4b of the front beam member 4, the protrusion member 44 is mounted to extend from a position at a distance (L/2) corresponding to a half of the length L of the connecting member 6, within the length from the connecting portion 4a with the connecting member 6 to the end portion 4c, to a position at a distance corresponding to the length L. In the example shown in FIG. 5, the protrusion member 44 is mounted as a continuous body extending to the end portion 4c. The protrusion member 44 may be divided into a plurality of pieces and mounted as long as the protrusion members 44 come into contact with the high-rigidity portion 8e in a collision.

Figure 8:
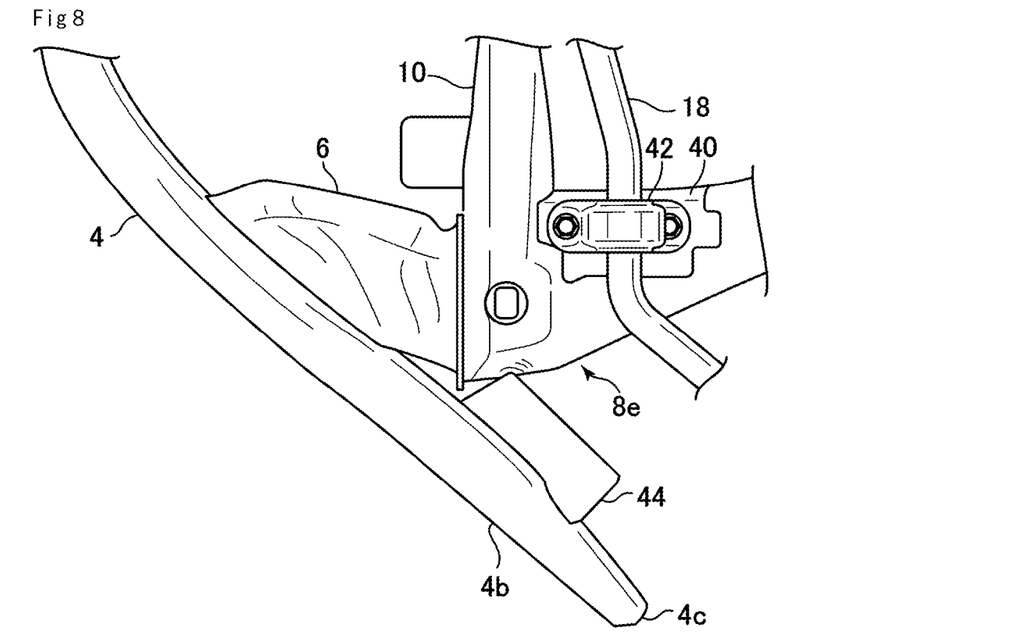
FIG. 8 is a plan view of the left front portion of the vehicle, which shows another example of a deformed state of the front vehicle-body structure of the vehicle of the present embodiment after a collision.

Moreover, as shown in FIG. 8 described later, when the side end portion 4b extends longer than the length L of the connecting member 6, the protrusion member 44 is mounted in the range of length from L/2 to L from the connecting portion 4a with the connecting member 6. A contact portion 8f of the side frame 8 shown in FIG. 5 indicates, according to calculations, a contact position/touching position of the protrusion member 44 when the side end portion 4b of the front beam member 4 is deformed to simply bend in the direction indicated with an arrow B around a position indicated with A.

Figure 6:
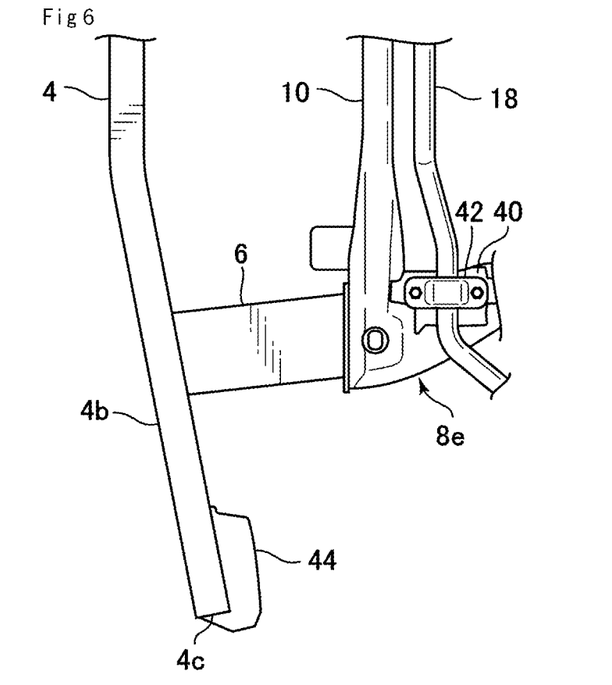
FIG. 6 is a plan view of the left front portion of the vehicle, which shows a non-deformed state of the front vehicle-body structure of the vehicle of the present embodiment before a collision.
Figure 9:
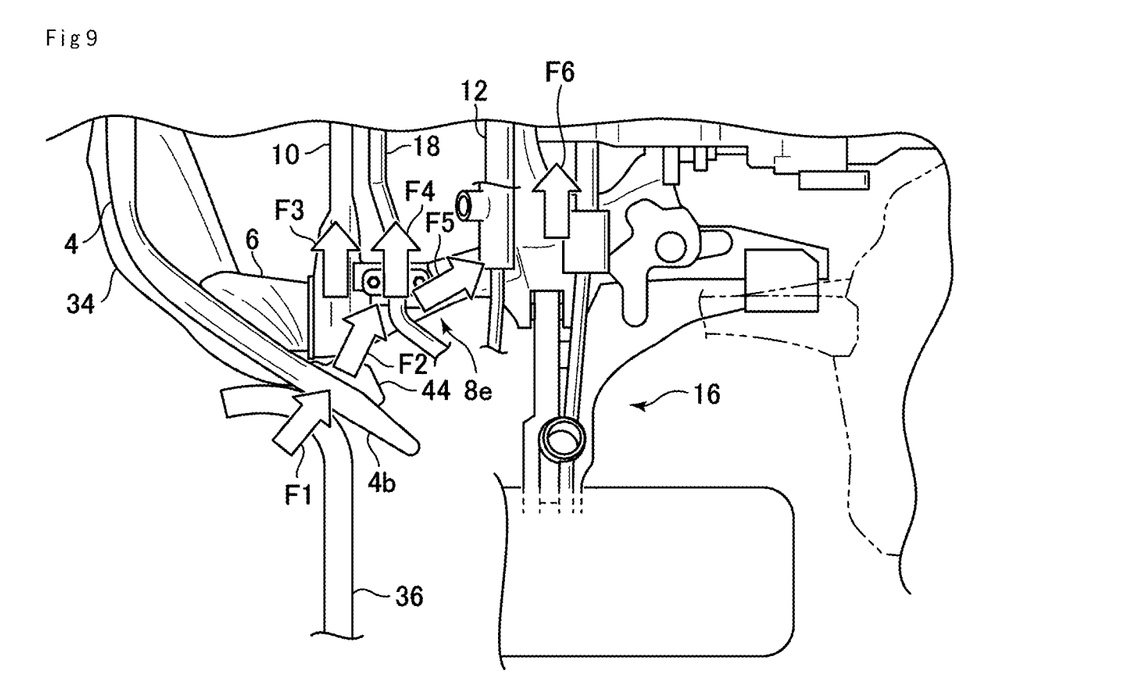
FIG. 9 is a plan view showing the left front portion of the vehicle, for explaining a concept of load transmission in the front vehicle-body structure of the vehicle of the present embodiment in a collision.

Next, a function of the front vehicle-body structure of the vehicle of the embodiment in a small overlap collision will be described using FIG. 6 to FIG. 9. FIG. 6 is a plan view of the left front portion of the vehicle, which shows a non-deformed state of the front vehicle-body structure of the vehicle of the present embodiment before a collision, FIG. 7 is a plan view of the left front portion of the vehicle, which shows one example of a deformed state of the front vehicle-body structure of the vehicle of the present embodiment after a collision, FIG. 8 is a plan view of the left front portion of the vehicle, which shows another example of a deformed state of the front vehicle-body structure of the vehicle of the present embodiment after a collision, and FIG. 9 is a plan view showing the left front portion of the vehicle, for explaining a concept of load transmission in the front vehicle-body structure of the vehicle of the present embodiment in a collision.

First, in a small overlap collision, a load is transmitted to the front beam member 4 from an obstacle colliding with the front bumper 34 (see reference sign 36 in FIG. 2).

Figure 7:
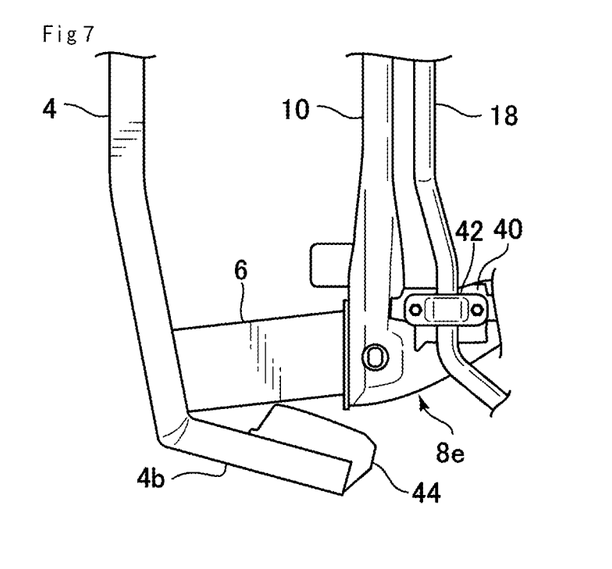
FIG. 7 is a plan view of the left front portion of the vehicle, which shows one example of a deformed state of the front vehicle-body structure of the vehicle of the present embodiment after a collision.

For example, when the input position (input position in the vehicle width direction) of the collision load to the side end portion 4b of the front beam member 4 is a position spaced part from the connecting portion 4a with the connecting member 6, the front beam member 4 is mainly deformed to bend toward the vehicle rear side, and is deformed from the state shown in FIG. 6 into the state shown in FIG. 7. Due to such a deformation, as shown in FIG. 7, the protrusion member 44 comes into contact with the high-rigidity portion 8e. In such a small overlap collision, although there is a variation in the deformation amount when the front beam member 4 is deformed toward the vehicle rear side by the transmission of the load to the connecting member 6, it is possible to cause the protrusion member 44 to come into contact with the high-rigidity portion with the deformation of the connecting member 6.

When the input position of the collision load to the side end portion 4b is a position near the connecting portion 4a with the connecting member 6, as shown in FIG. 8, the connecting member 6 is deformed as if being crushed, and the front beam member 4 is deformed and moved toward the vehicle rear side. Due to such a deformation, as shown in FIG. 8, the protrusion member 44 comes into contact with the high-rigidity portion 8e.

In particular, in the present embodiment, since the protrusion member 44 is mounted at least on a position at a relatively close distance L/2 to the connecting portion 4a with the connecting member 6, even when the connecting member 6 itself is deformed as if being crushed, the protrusion member 44 surely comes into contact with the high-rigidity portion 8e.

Next, the transmission of load to the respective members when the protrusion member 44 comes into contact with the high-rigidity portion 8e in a small overlap collision will be described using FIG. 9.

As shown in FIG. 9, when the protrusion member 44 comes into contact with the high-rigidity portion 8e due to deformation of the front beam member 4 and the connecting member 6 in the small overlap collision, a load as shown by an arrow F1 is input to the front beam member 4 from the obstacle 36, and this input load is transmitted from the protrusion member 44 to the high-rigidity portion 8e of the side frame 8 as a load indicated by an arrow F2. Such a load F2 is partly transmitted to the front cross member 10 as shown by an arrow F3 through the high-rigidity portion 8e of the side frame 8 and the mounting portions 8b, 8c, and also transmitted to the stabilizer bar 18 as shown by an arrow F4.

Moreover, the load F2 is partly transmitted toward the vehicle rear side through the high-rigidity portion 8e of the side frame 8 as shown by an arrow F5, and transmitted to the center cross member 12 through the mounting portion 8d as shown by arrow F6.

With such load transmission, in a so-called small overlap collision, a collision load directed toward the vehicle rear side that is received by the side end portion 4b is transmitted as a load directed toward the vehicle width direction to the respective members 10, 18, 12 through the high-rigidity portion 8e of the side frame 8. Particularly, in the present embodiment, since the rigidity of the mounting portion 8c is enhanced, the load is transmitted mainly to the front cross member 10. Therefore, according to the present embodiment, it is possible to effectively generate a lateral force in the vehicle width direction on the vehicle. Such generation of a lateral force causes lateral movement of the vehicle in the small overlap collision, thereby reducing impact.

Next, the function and effect of the front vehicle-body structure of the vehicle according to the embodiment will be described.

First, according to the embodiment, the high-rigidity portion 8e having a higher rigidity than in other portions of the side frame 8 is formed at the connecting portion (mounting portion 8b) between the front-end portion 8a of the side frame 8 and the cross member 10, and the front beam member 4 has the side end portion 4b extending on the vehicle-width-direction outer side relative to the connecting portion 4a with the connecting member 6, and the protrusion member 44 protruding from the side end portion 4b toward the vehicle rear side, the protrusion member 44 being configured to come into contact with the high-rigidity portion 8e from the vehicle-width-direction outer side when a collision load is input to the side end portion 4b from the vehicle front side. Thus, according to the present embodiment, in a so-called small overlap collision, a collision load directed toward the vehicle rear side that is received by the side end portion 4b is transmitted as a load directed toward the vehicle width direction to the cross member 10 through the high-rigidity portion 8e. Thus, a lateral force in the vehicle width direction on the vehicle 1 may be effectively generated. Such generation of a lateral force causes lateral movement of the vehicle 1 in the small overlap collision, thereby reducing impact.

Moreover, according to the present embodiment, at the side end portion 4b, the protrusion member 44 of the front beam member 4 is provided in a range from a position at a distance (L/2) corresponding to a half of a predetermined length L of the connecting member 6 to a position at a distance (L) corresponding to the predetermined length L of the connecting member 6 with reference to the connecting portion 4a between the front beam member 4 and the connecting member 6. Here, it is assumed that, in a so-called small overlap collision, a main load input position to the side end portion 4b (the load input position in the vehicle width direction of the side end portion 4b) varies, and consequently a deformed state of the side end portion 4b of the front beam member 4 varies. Even in such a case, according to the present embodiment, since the protrusion member 44 is mounted in the predetermined distance range (L/2 to L) at the side end portion 4b, the protrusion member 44 may more effectively come into contact with the high-rigidity portion 8e and generate the lateral force directed toward the vehicle width direction on the vehicle 1.

Further, according to the present embodiment, since the protrusion member 44 of the front beam member 4 is continuously mounted over the entire range from a position at the distance (L/2) corresponding to a half of a predetermined length of the connecting member 6 to a position at the distance (L) corresponding to the predetermined length of the connecting member 6 at the side end portion 4b, the protrusion member 44 may more effectively come into contact with the high-rigidity portion 8e.

Furthermore, according to the present embodiment, since the high-rigidity portion 8e is formed to extend from the connecting portion (mounting portion 8b) between the front-end portion 8a of the side frame 8 and the cross member 10 to the connecting portion (mounting portion 8d) between the side frame 8 and the center cross member 12, the load input to the high-rigidity portion 8e from the vehicle-width-direction outer side is also transmitted to the center cross member 12, thereby more effectively generating the lateral force directed toward the vehicle width direction on the vehicle 1.

In addition, according to the present embodiment, the vehicle 1 includes the support bracket 40 for supporting the stabilizer 18 mounted adjacent to the cross member 10 and the support bracket 40 is at least partly secured to the cross member 10. Therefore, the load input from the vehicle-width-direction outer side is also transmitted to the stabilizer 18 by the protrusion member 44, thereby more effectively generating the lateral force directed toward the vehicle width direction on the vehicle 1.

REFERENCE SIGNS LIST

1 Vehicle
2 Suspension subframe
4 Front beam member
4a Connecting portion with connecting member
4b Side end portion
4c End portion
6 Connecting member
8 Side frame/suspension side frame
8a Front-end portion of side frame
8b Mounting portion of front cross member
8c Mounting portion of support bracket
8d Mounting portion of center cross member
8e High-rigidity portion
8f Expected contact position
10 Front cross member/front suspension cross member
12 Center cross member/center suspension cross member
13, 15 Suspension support member
16 Suspension
18 Stabilizer bar, stabilizer
34 Front bumper
36 Obstacle/barrier
40 Support bracket of stabilizer bar
42 Support member
44 Protrusion member (protrusion)
F1-F6 Load

The invention claimed is:

1. A front vehicle-body structure of a vehicle, comprising:
a suspension subframe including a pair of left and right-side frames extending in a vehicle front-rear direction;
a front cross member connecting front-end portions of the side frames in a vehicle width direction;
a front beam member extending in the vehicle width direction on a vehicle front side relative to the suspension subframe;
a pair of left and right connecting members connecting front-end portions of the pair of left and right-side frames to the front beam member in the vehicle front-rear direction;
a high-rigidity portion having a higher rigidity than other portions of the side frame at a connecting portion between the front-end portion of each of the side frames and the front cross member, wherein
the front beam member has a side end portion extending on a vehicle-width-direction outer side relative to a connecting position with each of the pair of left and right connecting members; and
a protrusion portion protruding from the side end portion toward a vehicle rear side, the protrusion portion being configured to come into contact with the high-rigidity portion from the vehicle-width-direction outer side when a collision load from the vehicle front side is input to the side end portion.

2. The front vehicle-body structure of the vehicle according to claim 1, wherein
each of the pair of left and right connecting members between the front-end portion of the side frame and the front beam member has a predetermined length in the vehicle front-rear direction, and, at the side end portion, the protrusion portion of the front beam member is provided in a range from a position at a distance corresponding to a half of the predetermined length of the connecting member to a position at a distance corresponding to the predetermined length of the connecting member with reference to the connecting position between the front beam member and the connecting member.

3. The front vehicle-body structure of the vehicle according to claim 2, wherein,
at the side end portion, the protrusion portion of the front beam member is provided continuously over an entire range from the position at the distance corresponding to a half of the predetermined length of the connecting member to the position at the distance corresponding to the predetermined length of the connecting member.

4. The front vehicle-body structure of the vehicle according to claim 3, wherein
the suspension subframe further includes a center cross member extending in the vehicle width direction on the vehicle rear side relative to the front cross member and connecting the side frames in the vehicle width direction, and
the high-rigidity portion is formed to extend from the connecting portion between the front-end portion of each of the side frames and the front cross member to a connecting portion between the side frame and the center cross member.

5. The front vehicle-body structure of the vehicle according to claim 4, wherein
the vehicle further includes a stabilizer mounted adjacent to the front cross member and a support bracket for supporting the stabilizer, and
the support bracket is at least partly secured to the front cross member.

6. The front vehicle-body structure of the vehicle according to claim 3, wherein
the vehicle further includes a stabilizer mounted adjacent to the front cross member and a support bracket for supporting the stabilizer, and
the support bracket is at least partly secured to the front cross member.

7. The front vehicle-body structure of the vehicle according to claim 2, wherein
the suspension subframe further includes a center cross member extending in the vehicle width direction on the vehicle rear side relative to the front cross member and connecting the side frames in the vehicle width direction, and
the high-rigidity portion is formed to extend from the connecting portion between the front-end portion of each of the side frames and the front cross member to a connecting portion between the side frame and the center cross member.

8. The front vehicle-body structure of the vehicle according to claim 7, wherein:
the connecting members are mounted and both end portions of the front cross member are secured at a mounting portion at the front cross member connecting front-end portions of the side frames,
both end portions of the front cross member have an angular U-shaped cross-section, and
the mounting portion has a closed cross-section formed by this angular U-shaped cross-section and the side frame.

9. The front vehicle-body structure of the vehicle according to claim 2, wherein
the vehicle further comprises a stabilizer mounted adjacent to the front cross member, and a support bracket for supporting the stabilizer, and
the support bracket is at least partly secured to the front cross member.

10. The front vehicle-body structure of the vehicle according to claim 1, wherein
the suspension subframe further includes a center cross member extending in the vehicle width direction on the vehicle rear side relative to the front cross member and connecting the side frames in the vehicle width direction, and
the high-rigidity portion is formed to extend from the connecting portion between the front-end portion of each of the side frames and the front cross member to a connecting portion between the side frame and the center cross member.

11. The front vehicle-body structure of the vehicle according to claim 1, wherein
the vehicle further comprises a stabilizer mounted adjacent to the front cross member, and a support bracket for supporting the stabilizer, and
the support bracket is at least partly secured to the front cross member.

12. The front vehicle-body structure of the vehicle according to claim 11, wherein:
the support bracket is partly secured to a mounting portion of the front cross member on which the side frame is mounted,
the support bracket has an angular U-shaped cross-section and is mounted to the front side frame, and
the high-rigidity portion is formed on the side frame by mounting the support bracket to the side frame at the mounting portion.

* * * * *